US007188119B2

(12) United States Patent
Butler et al.

(10) Patent No.: US 7,188,119 B2
(45) Date of Patent: Mar. 6, 2007

(54) ENTITLEMENTS ADMINISTRATION

(75) Inventors: Scott T. Butler, Oakville (CA); Dennis B. Karbach, Austin, TX (US); Michael J. Wilson, Toronto (CA); Mark Boudreau, Toronto (CA); Paul M. Brown, Mississauga (CA); John Fotheringham, Nepean (CA); Richard W. Steinke, Toronto (CA); Alden Cuddihey, Kanata (CA); Ramneek Mahal, Caledon (CA); Sinisa Aleksa, Brampton (CA); Jane R. Shantz, Toronto (CA); Ann K. English, Fredricton (CA)

(73) Assignee: Accenture Global Services GmbH, Schaffhausen (CH)

( * ) Notice: Subject to any disclaimer, the term of this patent is extended or adjusted under 35 U.S.C. 154(b) by 314 days.

(21) Appl. No.: 10/422,257

(22) Filed: Apr. 23, 2003

(65) Prior Publication Data
US 2004/0210580 A1 Oct. 21, 2004

(30) Foreign Application Priority Data
May 1, 2002 (CA) .................................. 2384364

(51) Int. Cl.
*G06F 17/30* (2006.01)
(52) U.S. Cl. ...................... 707/102; 707/100; 707/101; 707/103 R; 707/104.1; 715/500
(58) Field of Classification Search .................. 707/3, 707/9, 102, 100, 101, 103 R, 104.1; 705/2, 705/14, 11; 713/186; 700/108; 380/255; 715/510, 500
See application file for complete search history.

(56) References Cited

U.S. PATENT DOCUMENTS

| 5,457,747 | A | * | 10/1995 | Drexler et al. | ............... | 713/186 |
| 5,559,885 | A | * | 9/1996 | Drexler et al. | ............... | 235/380 |
| 5,790,668 | A | * | 8/1998 | Tomko | ....................... | 713/186 |
| 5,819,107 | A | * | 10/1998 | Lichtman et al. | ............... | 710/8 |

(Continued)

FOREIGN PATENT DOCUMENTS

JP 11096216 A * 4/1999

(Continued)

OTHER PUBLICATIONS

Kling, Automated Welfare Client Tracking and Service Inegration: The Political Economy of Computing, Communications of the ACM, Jun. 1978, vol. 21, No. 6, pp. 484-493.*

(Continued)

*Primary Examiner*—Frantz Coby
(74) *Attorney, Agent, or Firm*—Hogan & Hartson LLP

(57) ABSTRACT

In a database, records corresponding to individuals entitled to social benefits are routinely and automatically reviewed. Records meeting certain criteria are selected for assessment. As a result of the assessment, a number of risk indication flags may be associated with certain of the selected records. A list of the selected records is then ranked according to a priority that is based on number and significance of associated risk indication flags. The ranked list is then used determine an order in which the records will be reviewed by caseworkers to which the records are output.

42 Claims, 5 Drawing Sheets

U.S. PATENT DOCUMENTS

| | | | |
|---|---|---|---|
| 6,067,522 A * | 5/2000 | Warady et al. | 705/2 |
| 6,292,795 B1 * | 9/2001 | Peters et al. | 707/3 |
| 6,324,338 B1 * | 11/2001 | Wood et al. | 386/83 |
| 6,415,261 B1 * | 7/2002 | Cybul et al. | 705/14 |
| 6,539,271 B2 * | 3/2003 | Lech et al. | 700/108 |
| 7,003,791 B2 * | 2/2006 | Mizutani | 725/21 |
| 2002/0046404 A1 * | 4/2002 | Mizutani | 725/58 |
| 2002/0111842 A1 * | 8/2002 | Miles | 705/8 |
| 2002/0118954 A1 * | 8/2002 | Barton et al. | 386/83 |
| 2002/0152113 A1 * | 10/2002 | Butz | 705/11 |
| 2003/0087277 A1 * | 5/2003 | Miller | 705/2 |
| 2003/0093304 A1 * | 5/2003 | Keller et al. | 705/4 |
| 2003/0093794 A1 * | 5/2003 | Thomas et al. | 725/46 |
| 2003/0188200 A1 * | 10/2003 | Paquin et al. | 713/202 |
| 2004/0038664 A1 * | 2/2004 | Stoks | 455/404.1 |
| 2004/0044688 A1 * | 3/2004 | Brudz et al. | 707/104.1 |
| 2004/0172284 A1 * | 9/2004 | Sullivan et al. | 705/2 |
| 2004/0210580 A1 * | 10/2004 | Butler et al. | 707/9 |
| 2005/0152551 A1 * | 7/2005 | Defreese et al. | 380/255 |
| 2005/0183028 A1 * | 8/2005 | Clough et al. | 715/771 |
| 2006/0036472 A1 * | 2/2006 | Crockett | 705/3 |
| 2006/0047188 A1 * | 3/2006 | Bohan | 600/300 |

FOREIGN PATENT DOCUMENTS

WO    WO 2005026919 A2 *    3/2005

OTHER PUBLICATIONS

March Lauritsen, Knowledge-Based Approaches to Government Benefits Analysis, ACM, 1991, pp. 98-107.*

Alexander et al., Putting the Byte on Canadian Social Welfare Agencies, 1990, ACM, pp. 13-19.*

Nizza, Epic Expert Assistant Calculator, 1990 ACM, pp. 38-44.*

* cited by examiner

| REASON FOR APPLYING/ TYPE OF ASSISTANCE 402 | GRANT DATE 404 | | | | CASE STATUS 406 | | | | | | | |
|---|---|---|---|---|---|---|---|---|---|---|---|---|
| MEMBER NAME(S) 408 | MEMBER ROLE(S) 410 | | | | SOCIAL INSURANCE NUMBER 412 | | | | | | | |
| HEALTH CARD NUMBER 414 | DATE OF BIRTH 416 | | | | ACCOMMODATION INFORMATION 418 | | | | | | | |
| IMMIGRATION STATUS 420 | EDUCATION STATUS 422 | | | | DATE OF LAST CVP REVIEW 424 | | | | | | | |
| INCOME TYPE 426 | INCOME AMOUNT 428 | | | | EMPLOYER INFORMATION 430 | | | | | | | |
| ASSET TYPE 432 | ASSET VALUE 434 | | | | PAYMENT INFORMATION 436 | | | | | | | |
| NAME AND ADDRESS OF SUPPORTING PERSON(S) 438 | SUPPORT INFORMATION 440 | | | | COURT ARRANGEMENT INDICATOR 442 | | | | | | | |
| FLAG 1 | FLAG 2 | FLAG 3 | FLAG 4 | FLAG 5 | FLAG 6 | FLAG 7 | FLAG 8 | FLAG 9 | FLAG 10 | FLAG 11 | FLAG 12 | FLAG 13 |

| | FEBRUARY 12, 2001 | ONGOING |
|---|---|---|
| BLIND | | |
| JOHN DOE; JANE DOE; SALLY DOE | APPLICANT; SPOUSE; DEPENDENT CHILD | 482 908 031; 473 919 042; 594 010 143 |
| 6293 053 792; 6302 164 803; 7182 942 681 | JUNE 8, 1966; DECEMBER 19, 1966; DECEMBER 1, 2001 | RESIDENT: 347 BRUNSWICK AVENUE, TORONTO, ON, RENT $675/MONTH |
| CANADIAN; CANADIAN; CANADIAN | POST SECONDARY COMPLETED; POST SECONDARY COMPLETED; N/A | NOVEMBER 1, 2001 |
| PART-TIME EMPLOYMENT | $140/WEEK | PERK CAFE, 561 BLOOR STREET, TORONTO, ON |
| REGISTERED RETIREMENT SAVINGS PLAN | $4,512 | $200/WEEK $60/WEEK |
| N/A | N/A | N/A |

| 0 | 1 | 0 | 1 | 0 | 0 | 0 | 0 | 0 | 0 | 0 |
|---|---|---|---|---|---|---|---|---|---|---|

500

ENTITLEMENTS ADMINISTRATION

This application claims the priority benefit of Canadian Patent Application Serial No. 2,384,364, filed May 1, 2002, titled "ENTITLEMENTS ADMINISTRATION."

FIELD OF THE INVENTION

The present invention relates to the field of computer systems and, more particularly, to the use of a computer system with related database mechanisms to assist in the mechanized administration of entitlements, such as welfare or disability entitlements.

BACKGROUND

An organization which is seized with the responsibility of providing social assistance to entitled individuals of a jurisdiction typically requires that individual applicants fill out an application form and interview with an intake worker in the organization. If an application is accepted, a caseworker from the organization is typically assigned to the entitled individual and entitlements begin to flow to the entitled individual.

If the entitled individual has an enquiry or a change in circumstances, the entitled individual typically must contact his or her caseworker or another administrator at the organization. Given the large volume of requests typically borne by the organization, it is often difficult to address enquiries and changes correctly and in a timely fashion.

A fraudulent entitlement may be discovered by reason of a tip from a member of the public. Absent this, it is largely the responsibility of the assigned caseworker to ensure that an individual receiving an entitlement continues to be entitled. Given the large caseload typically managed by a caseworker, there is a significant likelihood that a fraudulent entitlement will be unnoticed. A fraudulent entitlement may, perhaps, be noticed where a single caseworker performs a detailed review of each individual receiving an entitlement in the caseworker's caseload. However, the length of time that would be required for a detailed review of each case in a caseworker's caseload would mean that a fraudulent entitlement could go unnoticed for a lengthy time period. To reduce the time period, the administration of the entitlement could hire extra caseworkers and spread the work around to more caseworkers, thus reducing the size of the caseload for each caseworker. However, the benefit of such a scheme may come at too high a cost and even if the cost was acceptable, the inherent inaccuracy of human review may allow a fraudulent entitlement to go unnoticed.

Accordingly, a need remains for an efficient system for the administration of entitlements.

Technical considerations of the requirements for a computer system with related database mechanisms required to provide such efficiencies have resulted in the invention disclosed below.

SUMMARY

By automatically reviewing individual records and recognizing changes in those records, a likelihood that a right to an entitlement, held by an individual associated with the record, has changed may be more quickly and more accurately assessed by an entitlements administration system than by a caseworker. As a record is reviewed, risk indicators may be associated with the record. The number of risk indicators of different types may be totaled to provide an overall risk indication that may then be used to prioritize more thorough reviews of the record and the individual associated with the record and, thus, maximize the likely detection of fraud.

In accordance with an aspect of the present invention there is provided a method of using a fast computer system to assist in assessing a record review priority. The method includes providing a computer system having associated database system. The method further includes the computer system examining a database record, where said database record relates to an individual with an entitlement, for conditions representative of a likelihood that a right to the entitlement has changed and, where a determination is made by the computer system, based on the examining, that at least one of the conditions representative of the likelihood that the right to the entitlement has changed, automatically associating a computer selected risk indicator with the record. In another aspect of this invention, there is provided an entitlements administration server carrying out this method. In a further aspect of the present invention, there is provided a software medium that permits a general purpose computer to carry out this method.

In accordance with another aspect of the present invention there is provided a method of using a fast computer system to assist in assessing likelihood that a right to an entitlement has changed. The method includes providing a computer system having an associated database system. The method further includes the computer system examining a database record of an individual with an entitlement for an indication of accommodation costs and an indication of total income and, if a ratio obtained, by the computer system, from the indication of accommodation costs and the indication of total income is within a warning range, associating a computer selected risk indicator with the database record. In another aspect of this invention, there is provided an entitlements administration server for carrying out this method. In a further aspect of present invention, there is provided a software medium that permits a general purpose computer to carry out this method.

In accordance with a further aspect of the present invention there is provided a method of using a fast computer system to assist in assessing likelihood that a right to an entitlement has changed. The method includes providing a computer system having an associated database system. The method further includes the computer system examining a database record of an individual with an entitlement for (i) an indication that the individual with an entitlement is receiving support payments from a supporting person and (ii) an indication of an address for the supporting person and, where, as determined by the computer system, the database record has an indication the individual receiving the support payments but no indication of the address for the supporting person, associating a support-in-pay risk indicator with the database record. In another aspect of this invention, there is provided an entitlements administration server for carrying out this method.

In accordance with a still further aspect of the present invention there is provided a method of using a fast computer system to assist in assessing a likelihood that a right to an entitlement has changed. The method include providing a computer system having an associated database system. The method further includes the computer system examining a database record of an individual with an entitlement for (i) an indication that the individual with an entitlement is receiving support payments from any supporting person and (ii) an indication that an arrangement for support payments has been made and, where, as determined by the computer system, the database record has an indication the individual is not receiving the support payments and an indication that an arrangement for support payments has been made, associating a no-support-pay risk indicator with the database record. In another aspect of this invention, there is provided an entitlements administration server for carrying out this method.

In accordance with an even further aspect of the present invention there is provided a method of using a fast computer system to assist in assessing a likelihood that a right to an entitlement has changed. The method include providing a computer system having an associated database system. The method further includes the computer system determining a last entitlement review date associated with a database record of an individual with an entitlement, if any and, if, as determined by the computer system, the last entitlement review date is older than a threshold, associating a review-due risk indicator with the database record. In another aspect of this invention, there is provided an entitlements administration server for carrying out this method.

In accordance with an even further aspect of the present invention there is provided a method of using a fast computer system to assist in assessing a likelihood that a right to an entitlement has changed. The method include providing a computer system having an associated database system. The method further includes the computer system examining a database record of an individual with an entitlement for an entitlement grant date associated with the individual and, if, as determined by the computer system, the entitlement grant date is older than a threshold, associating a time-on-assistance risk indicator with the database record. In another aspect of this invention, there is provided an entitlements administration server for carrying out this method.

Other aspects and features of the present invention will become apparent to those of ordinary skill in the art upon review of the following specific embodiments of the invention in conjunction with the accompanying figures.

BRIEF DESCRIPTION OF THE DRAWINGS

In the figures which illustrate example embodiments of this invention:

FIG. 4 illustrates an exemplary data structure for a record according to an embodiment of the present invention; and FIG. 5 illustrates an example record conforming to the exemplary data structure of FIG. 4.

DETAILED DESCRIPTION

Figure 1:
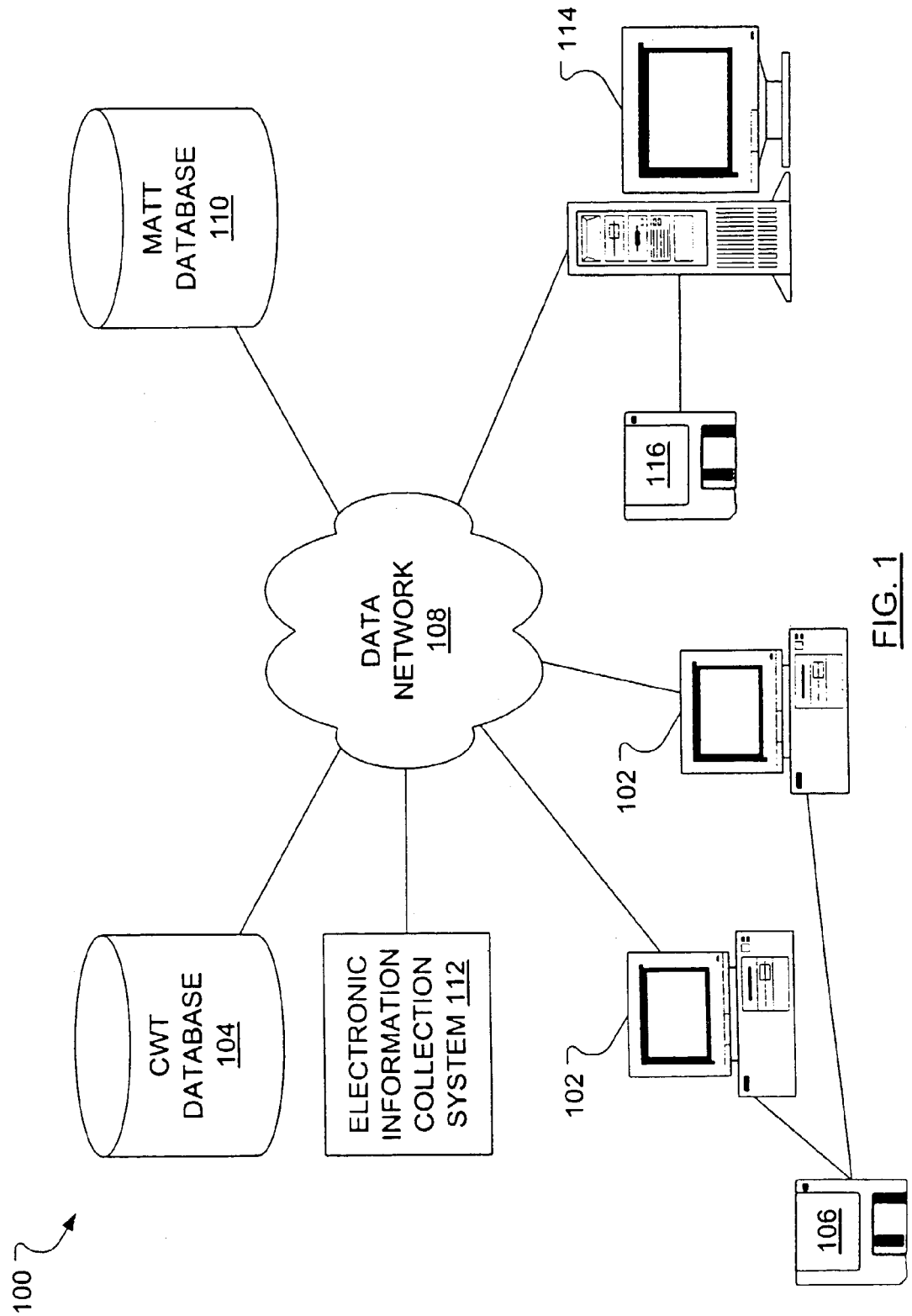
FIG. 1 schematically illustrates an entitlements administration system.

As illustrated in FIG. 1, multiple caseworker workstations 102, in an entitlements administration system 100, maintain a connection to a data network 108, which may be a local area network (LAN), a wide area network (WAN) such as the Internet or a combination of the above such as a virtual private network (VPN). Also connected to the data network 108 is a Caseworker Technology (CWT) database 104, which may be, as is known, associated with a database server (not shown). The CWT database 104 may be used for storing, among other things, records relating to individuals entitled to social assistance (e.g., welfare and/or disability benefits). Also maintaining a connection to the data network 108 is an entitlements administration server 114. The caseworker workstations 102 may be loaded with entitlements administration software, for performing methods exemplary of the present invention, from a software medium 106. Similarly, the entitlements administration server 114 may be loaded with entitlements administration software, for performing methods exemplary of the present invention, from a software medium 116. Each of the software media 106, 116 could be a disk, a tape, a chip or a random access memory containing a file downloaded from a remote source. Also connected to the data network 108 is a monitoring and tracking tool (MATT) database 110, for use in monitoring and tracking records under review, and an electronic information collection system 112.

The entitlements administration system 100 is specifically designed to not be dependent on a particular computer or network type. Ideally, different jurisdictions that use different computers and network types and have widely varying entitlement rules can customize the entitlements administration system 100 for their own use. However, the entitlements administration system 100 is typically implemented on medium-sized server computers on a network, typically based on WINDOWS NT™ from Microsoft of Redmond, Wash. The CWT database 104 and the MATT database 110 are typically implemented as relational databases, such as those provided by Oracle of Redwood City, Calif.

The entitlements administration software may include an assessment tool for execution on the entitlements administration server 114 to autonomously assess the individual records stored in the CWT database 104 to prioritize the records. Once prioritized, certain of the records may be reviewed by caseworker in a process called a "Consolidated Verification Process" or simply "CVP". As will be understood upon review of the following, during a given run, the a tool assesses records according to a variety of criteria associated with a number of different flags (risk indication flags) and then assigns a priority ranking of high, medium or low to each record. Subsequent runs are used to update the priority of those records that have had a change occur in the CWT database 104 during the time that has elapsed since the assessment tool was last run.

The prioritized list of records may then be exported to a second tool, which may also be part of the entitlements administration software, where the second tool is for monitoring and tracking the records. Based on the prioritized lists monitoring and tracking tool (MATT) facilitates the assignment-(i.e., outputting) of the records to caseworkers by review priority. The order in which the records are assigned corresponds to the relative priority of the records, i.e., the highest records are assigned first. In some instances, it is unlikely that all records in the prioritized list will be reviewed before the assessment tool is executed again and supplies the monitoring and tracking tool with a new prioritized list.

Each caseworker reviews records assigned to him/her in the order in which they are received. The CVP review for a particular assigned record includes a review of the particular assigned record and, if necessary, an in of the entitled individual associated with the particular assigned record. An "outcome" of the CVP review is then reported.

The entitlements administration system described herein is generally intended to be implemented as an improvement to an existing entitlements administration system. To appropriately determine a set of risk indication flags for use when prioritizing a given list of records, a statistical analysis may be performed on historical data relating to the individual records stored in the CWT database 104. The statistical analysis may help in identifying those conditions representative of a likelihood that a right to an entitlement has changed, i.e., those fields in the records that are particularly useful when assessing a record review priority. As will be apparent to a person skilled in the art, the nature of the determined risk indication flags will be highly dependent on the database on which the statistical analysis is performed.

Figure 2:
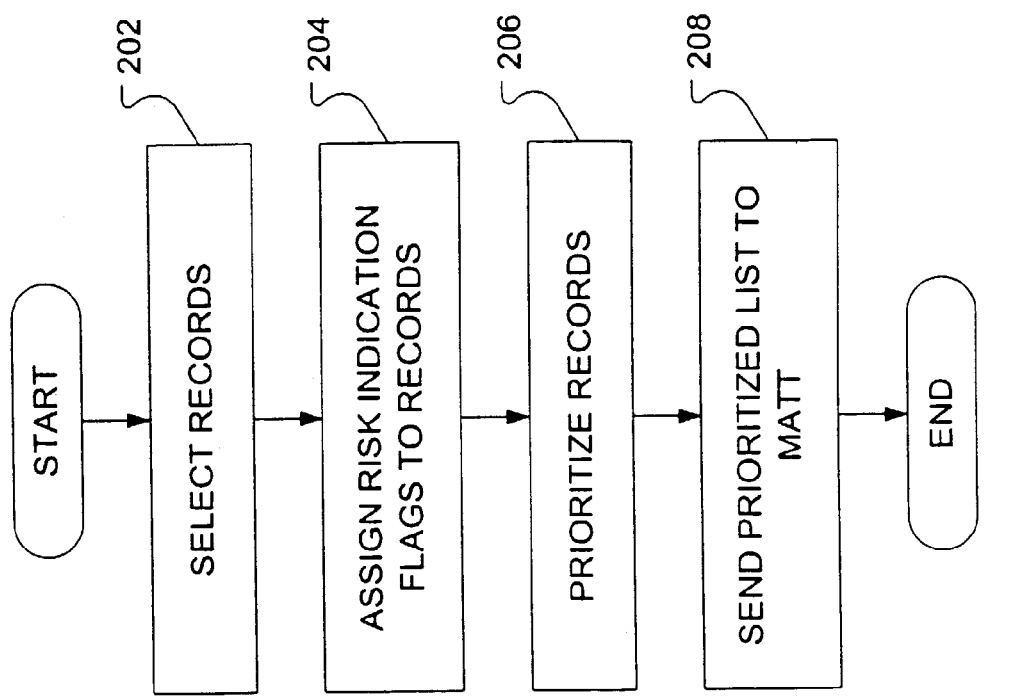
FIG. 2 illustrates the steps of an entitlement assessment method according to an embodiment of the present invention.

In operation, as illustrated in the flow diagram of FIG. 2, the assessment tool first selects (step 202) a subset of the records in the CWT data 104 (FIG. 1), where the subset of records may, for instance, have an office code that is found in a predetermined list of office codes. More particularly, when the entitlements administration system 100 (FIG. 1) is directed to a large group of entitled individuals, there may be certain special cases that fall outside the scope of the assessment tool and the related monitoring and tracking tool. For example, where an embodiment of the present invention is used in conjunction with a welfare program, those records associated with foster parents, handicapped children, individuals undergoing vocational rehabilitation, etc., may be special cases and may be excluded by the selecting step (step 202).

As the CWT database 104 (FIG. 1) is typically a relational database implemented using Oracle software, a person of ordinary skill in the art will understand that the selecting step (step 202) may comprise a standard query to the CWT database 104. Such a database query may include multiple parameters that establish criteria for the subset of the records in the CWT database 104 that are of interest to the entitlements administration system 100. For instance, the parameters may be set to select the subset of records with an "ongoing" case status, that is, all records that have been in the CWT database 104 for a time in excess of three months.

Once the records that are to be assessed have been selected, the assessment tool then reviews each record and associates risk indication flags (step 204) with the records where the information contained in the records corresponds to conditions that are associated with risk indication flags. The risk indication flags have significance given by either high or medium. Exemplary risk indication flags are discussed hereinafter.

When the association of risk indication flags with records is complete, the assessment tool forms a list of the selected records and prioritizes the list (step 206). Records that have no high risk indication flags and no indication flags are given "low" priority in the list. Records that have no high indication flags and at least one medium risk indication flag are given "medium" priority in the list. Records that have at least one high risk indication flag are given "high" priority in the list. Within the groups of records having high priority and medium priority, records are further prioritized based on the number of high and medium risk indication flags. The completed, prioritized list is then sent to the monitoring and tracking tool (step 208). In one embodiment of the present invention, the assessment tool is run once per week.

Based on the prioritized list received by the monitoring and tracking tool, records are output to the caseworker workstations 102. Each record has an individual associated with it and each caseworker is responsible for a set of these individuals. Each caseworker receives a prioritized sub-list of the records of the individuals for which he is responsible and reviews these records in the order indicated by the prioritized sub-list.

A record is reviewed for any changes in entitlements for the particular individual associated with the record. If, as a result of the review of the record, an interview is deemed necessary, the particular individual is contacted by the caseworker for an interview. Based on either the record alone or the record in combination with the interview, the CVP review is assigned an outcome. In one embodiment of the present invention, the outcome can take on one of five values: Terminated; Terminated with Overpayment; Overpayment; Arrears; and No Change. The MATT database 110 (FIG. 1) is used to maintain information (e.g., date of last review, outcome) regarding reviews of the records.

More particularly, an outcome of Terminated may indicate that the individual associated with the record no longer qualifies for an entitlement. An outcome of Terminated with Overpayment may indicate that the individual associated with the record was paid entitlements while no longer qualified for an entitlement and therefore has been overpaid. The Overpayment outcome may indicate that the entitlement due to the individual associated with the record decreased before the CVP review. An outcome of Arrears may indicate that the entitlement due to the individual associated with the record increased before the CVP review. The No Change outcome may indicate a lack of change in entitlement.

1.1 How the Database is Populated

Figure 3:
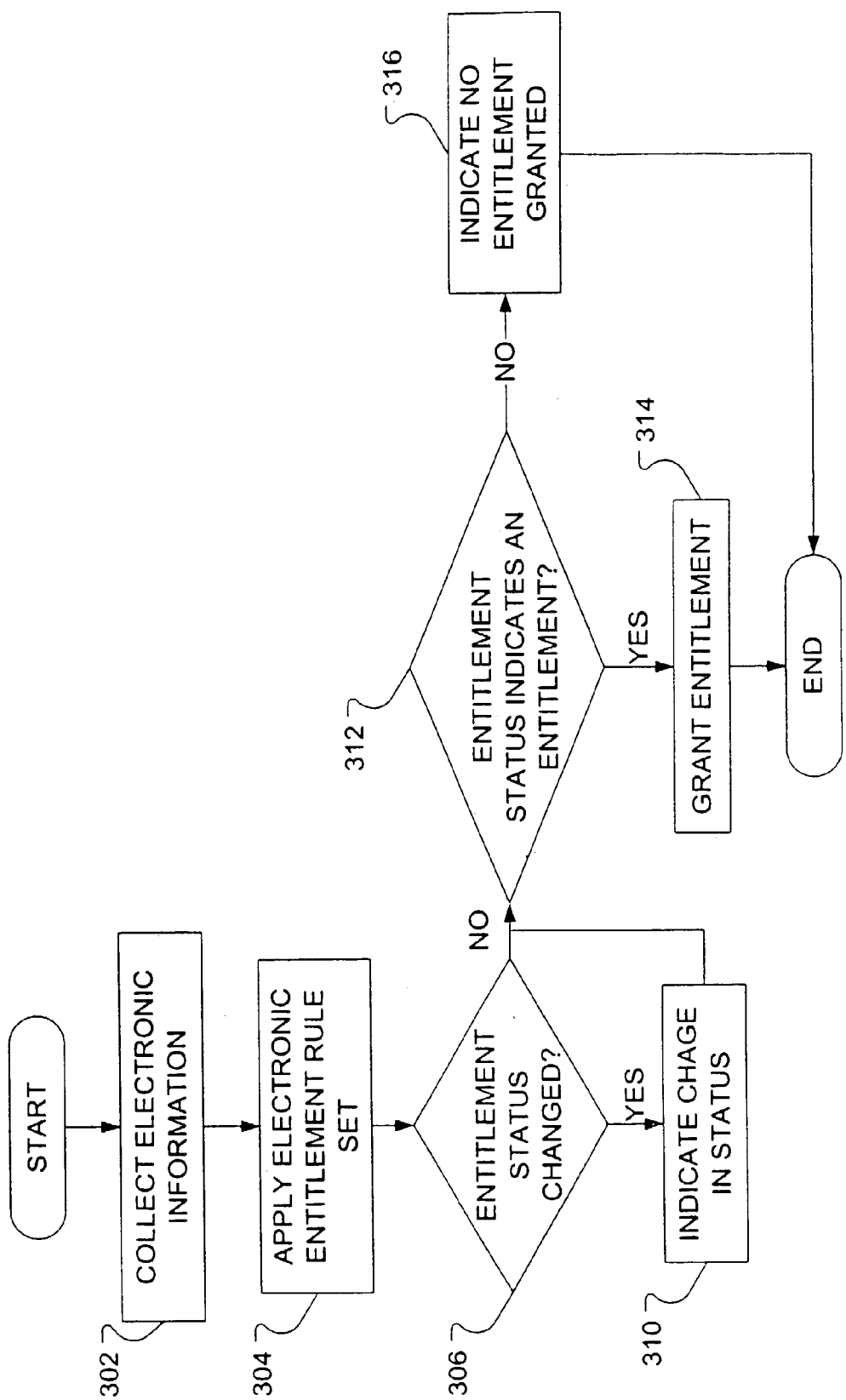
FIG. 3 illustrates the steps of an entitlement eligibility maintenance method according to an embodiment of the present invention.

As will be apparent to a person skilled in the art, it is important to properly maintain the records in the CWT database 104, as the records form a basis for the above assessment. Accordingly, the entitlements administration software may include a maintenance tool for maintaining the CWT database 104. Through the use of the maintenance tool, which may have a graphical user interface (GUI) presented at the caseworker workstation 102, electronic information about an applicant may be entered into the entitlements administration system 100. FIG. 3 illustrates steps taken by the maintenance tool to determine entitlement eligibility of an applicant, an initial step of which is collection of the electronic information (step 302) about the applicant. An electronic entitlement rule set may then be applied (step 304) to eligibility information for the applicant, where the electronic information supplies at least some of the eligibility information required to assess eligibility. Other information used as eligibility information may be drawn from publicly available databases or private (government) databases. The result of such an application of the electronic entitlement rule set may be an entitlement status. Where it is determined that the entitlement status indicates an entitlement (step 312), an entitlement may be granted to the applicant (step 314). However, where it is determined that the entitlement status does not indicate an entitlement (step 312), this information may be indicated (step 316) via the GUI.

The entitlement rule set, used in step 304 to determine the entitlement status of the given individual, is based on government legislation that establishes eligibility rules for those claiming an entitlement. For instance, the local government may dictate that an individual may not receive social assistance if the value of the assets of that individual exceed a certain threshold.

In future, an information change may be received from an individual with an entitlement, say, via a telephone interview with the caseworker assigned to the entitled individual. Again using the GUI of the maintenance tool, the caseworker may modify the electronic information (step 302) in the corresponding record in the CWT database 104 based on the received information change.

Alternatively, an entitled individual may not need to communicate the information change through the caseworker. The maintenance tool may be arranged to receive (step 302) certain electronic information changes via the electronic information collection system 112 (FIG. 1), which may be an interactive voice response system. The electronic information collection system 112, when associated with the maintenance tool, may also allow the entitled individual to review at least a portion of the electronic information on the record in the CWT database 104. In another embodiment of the present invention, the electronic information collection system 112 may be an HTTP server that provides a graphical user interface allowing the entitled individual to alter certain corresponding electronic information. For sensitive electronic information changes, the electronic information collection system 112 may require a password such that the electronic information collection may occur only where a user supplies a correct password.

Such an information change may modify the eligibility information for the entitled individual. Consequently, if the eligibility information has been modified, the entitlement rule set may be electronically applied (step 304) to the eligibility information to obtain a current entitlement status. Where it is determined (step 306) that the current entitlement status differs from an entitlement status previously associated with the eligibility information, the GUI of the maintenance tool may indicate the difference to the caseworker (step 310).

Occasionally, legislation may change entitlement eligibility rules. Subsequently to such a change, corresponding changes may be made to the entitlement rule set. In the case of a receipt of a single new rule for entitlement rule set, an indication of whether the new rule has either prospective, or prospective and retrospective, application may also be received. Such an indication will relate directly to the legislation that introduced the new rule. Where, for instance, the new rule has retrospective application, the entitlement rule set, as modified with the new rule, may be electronically applied (step 304) to the electronic eligibility information for all entitled individuals to obtain a current entitlement status. If it is determined (step 306) that the current entitlement status for an entitled individual differs from the entitlement with the eligibility information for that entitled individual, the GUI of the maintenance tool may indicate the difference to the appropriate caseworker (step 310).

Returning to the operation of the assessment tool, consider the association of the following exemplary risk indication flags with records in 104.

1.2 Exemplary Risk Indication Flags Nos. 1 & 2—Accommodation Costs

It may be that, in a given jurisdiction, accommodation costs for an entitled individual are expected to be approximately 50% of a total entitlement allocated to an entitled individual. Accommodation costs may include such categories as: rent payments, lease payments, mortgage payments, agreement-for-sale payments, property taxes, condominium or co-op maintenance fees, property insurance premiums, heating fuel costs and utility costs. The accommodation cost is the sum of allowable expenses (according to a policy set for the relevant jurisdiction) from each of these categories.

To identify cases where accommodation costs exceed this expectation, a high risk indication flag for accommodation-costs is associated with a record when it is determined that accommodation costs, reported by the entitled individual corresponding to the record, equal or exceed 80% of the total disposable income of the entitled individual. A medium risk indication flag for accommodation-cost associated with a record when it is determined that accommodation costs, reported by the entitled individual corresponding to the record, are between 75 and 79% of the total disposable income of the entitled individual.

Determining whether conditions exist that merit the association of a risk indicator with a record typically require an examination of at least one field of the record of the entitled individual. As the record is preferably a record in a relational database, to read a particular field, as is necessary above to obtain a figure for accommodation costs and again to obtain a figure for income, all that is require is a database query of the sort known to those skilled in the art.

Employment income, training wages, welfare earnings, disability benefits and income from roomers, renters and boarders reflected in the record of the entitled individual may be factored in to a calculation of a Net Disposable Income for the entitled individual. Co-residency and sharing may also be taken into consideration when calculating an actual accommodation cost for the entitled individual. Consequently, actual accommodation costs may be compared with actual disposable income. Typically, this comparison may be quantified by obtaining a ratio of accommodation costs to disposable income.

There may be exceptions, i.e., there may be situations wherein accommodation costs fall into one of the ranges defined above for the association of a risk indication flag for accommodation-costs with a record, yet the risk indication flag for accommodation-costs is not associated with the record. For instance, the record for an individual boarding or living in a "family" situation may be excluded from the association of a risk indication flag for accommodation-cost.

There may also be situations wherein accommodation costs do not fall into one of the ranges defined above for the association of a risk indication flag for accommodation-costs yet a risk indication flag for accommodation-costs is associated with the record. For instance, incorrect amounts may be entered into the CWT database 104, by error or for any other reason. A record containing such an error can not be excluded from having a risk indication flag for accommodation-costs associated with it. In other instances, a given individual with disabilities may be have a rent amount on record in the CWT database 104 that is higher than the actual accommodation cost of the given individual. This can occur when the given individual lives in a group home or other supervised living arrangements. Until the rent cost is corrected, the record of the given individual can not be excluded from having a risk indication flag for accommodation-costs associated with it.

Although the above concerns the integrity of accommodation cost data specifically, it should be appreciated that the accuracy of any association of a risk indication flag with a record by the entitlements administration disclosed herein is dependent on the integrity of the data the system is given to process.

1.3 Exemplary Risk Indication Flag No. 3 Other Person at Address

It may be that an entitled individual has a roomer, boarder, co-resident or other accommodation sharer and the entitled individual has declared this fact such that the information is entered into the record in the CWT database 104. A medium risk indication flag for other-person-at-address may be associated with a record where an examination of the record reveals an indication of the presence of another person at the address of the entitled individual. The medium risk indication flag for other-person-at-address does not take into consideration the length of time such a co-resident is present. Nor is the gender of the person residing at the address of the entitled individual taken into consideration. Further, a family relationship between the entitled individual and the person residing at the address of the entitled individual may not be taken into consideration. Consequently, even if the person residing at the address of the entitled individual is a son or daughter of the entitled individual, the medium risk indication flag for other-person-at-address may be associated with the record of the entitled individual.

As will be apparent to a person skilled in the art, many of these risk indication flags have limitations based on the manner in which information was entered in the CWT database 104. As the risk indication flags are determined through a statistical analysis of historical data related to the CWT database 104, the entitlements administration system simply identifies those records for which a more thorough review may be necessary.

1.4 Exemplary Risk Indication Flags No. 4 & 9—Support In Pay/Support Not In Pay It may be unusual for an entitled individual to receive funds from a supporting person without knowledge of the whereabouts or employment of the supporting person. Thus, if an examination of the corresponding record reveals that the entitled individual is a "Sole Support Parent" and receives support whereabouts of the supporting person are unknown, a high risk indication flag support-in-pay may be associated with the corresponding record. A Sole Support Parent is an entitled individual where children were considered in establishing entitlement, but a spouse is not present. In particular, a given entitled individual is determined to be a Sole Support Parent if the record associated with the given entitled individual indicates a marital status that is other than "Common Law" or "Married" and indicates that dependant children are considered in determining the entitlement.

The high risk indication flag for support-in-pay (whereabouts of supporting person unknown) may be applied to all Sole Support Parents regardless of the case class (reason for assistance) indicated in the corresponding CWT database 104.

To determine whether the high risk indication flag for support-in-pay (whereabouts of supporting person unknown) is to be associated with a record in the CWT database 104 that corresponds to a given entitled individual, many parts of the record are considered. In particular, a field in the record may indicate that support payment is being deducted from each cheque for the given entitled individual. Another field, i.e., a "support person address unknown" field, may, in a binary fashion (checked/not checked), indicate whether the address of a support person is known. A further field, i.e., a "support person address" field, may indicate the address of the support person. To associate the high risk indication flag for support-in-pay (whereabouts of supporting person unknown) with the record, it may be first determined whether a support payment is being deducted from each cheque for the given entitled individual by a review of the appropriate field. Secondly, it may be determined whether the "support person address unknown" field is checked. Thirdly, the "support person address" field is reviewed for the presence of the word "unknown". If it is determined that an entitled individual is a Sole Support Parent receiving support from a supporting person whose address is unknown, the high risk indication flag for support-in-pay (whereabouts of supporting person unknown) may be associated with the corresponding record.

As was the case with previous risk indication flags, there may be exceptions. For instance, there may be more than one field for supplying the address of a supporting person. Consequently, it may be that an entitled individual receives support from more than one supporting person and that the address of only one of these supporting persons is unknown. A search for the word "unknown" in the "support person address" field may lead to an erroneous association of the high risk indication flag for support-in-pay (whereabouts of supporting person unknown) with the record. Such an erroneous association may be determined in a caseworker review of the record so that appropriate weight given to the flag in that review.

Where the entitled individual is a Sole Support Parent whose support is not in pay (i.e., support payments have been arranged but are not being received), a further flag, namely, a high risk indication flag for no-support-in-pay, may be associated with the corresponding record. This risk factor is considered to be present in the following circumstances. It may be that the record corresponding to an entitled individual indicates that support payments are not being made. The record may further provide evidence that a support agreement exists. As will be apparent to a person skilled in the art, indication, in a record, of a support agreement may include fields providing notice of provisions associated with the agreement, such as assignments or waivers. The effect that such provisions have on the application of the high risk indication flag for no-support-in-pay may be evident upon review, by the entitlements administration server 114, of each specific provision. Where the effect of these provisions is not clear to the entitlements administration server 114, a caseworker may consider the provisions, once the record has been flagged. The high risk indication flag for no-support-in-pay may be associated with a record where the record indicates that no support is being received, despite support having been arranged.

The record corresponding to an entitled individual may be reviewed for the presence of a "Court Arrangement Indicator" field to provide evidence of an arrangement for support payments. The record may further include a "Court Number" field, which, when filled in, indicates that support payments have been arranged. In a given record, the "Court Arrangement Indicator" field may be coded to "Yes" without a court number in the "Court Number" field. The given record would then be erroneously associated with the high risk indication flag for no-support-in-pay. This erroneous association may be located during the file review step of the CVP review. Subsequent to locating such an erroneous association, the CWT database 104 may be amended so that the court number is correctly reflected. In contrast, there may be a court number in the "Court Number " field without anything in the "Court Arrangement Indicator" field. Again, upon location of the error, the CWT database 104 may be amended so that the "Court Arrangement Indicator" field properly provides evidence of support payments. In either case, the high risk indication flag for no-support-in-pay can be ignored by the reviewing caseworker after discovery and correction of the CWT database 104 error, since support has been arranged.

A record may indicate an entitled individual is widowed (i.e., the record is in a "Widowed" Case Class). Such a record may appear to indicate that the entitled individual has no support in pay, in which case the high risk indication flag for no-support-in-pay is associated with the record. However, the caseworker's CVP review of the record may indicate that orphan's benefits, or widow's benefits are in pay or should be in pay. Support from a spousal relationship may be possible, where intended settlement may result in support.

A record in a "Spouse in Prison (Penal)" Case Class may also appear to indicate that the entitled individual has no support in pay and therefore that the high risk indication flag for no-support-in-pay should be associated with the record.

The high risk indication flag for no-support-in-pay may thus be used to bring the record to the attention of a caseworker so that it may be determined that the current situation of the entitled individual is, in fact, the same as that which is in the CWT database 104. It may be that the spouse has been released from prison and should now be paying support. There may also be a reconciliation that has not been declared.

1.5 Exemplary Risk Indication Flag No. 5—added Dependents

It may be that an entitled individual adds a dependent after entitlements have been granted. Such an addition of a dependent may lead to a re-assessment of the entitlement. If an examination of the record reveals an indication that a dependent child has been added to the record (i.e., the date of birth of the dependent child is after the date of the entitlement grant), a medium risk indication flag for added-dependent may be associated with the record corresponding to the entitled individual.

1.6 Exemplary Risk Indication Flag No. 6—Overdue Update Review

When implementing an entitlements administration system with prioritization of records by risk indication flag, as herein proposed, it may be that an entitlements administration system is already in place. In case, transitional provisions, and associated risk indication flags, may be required. In particular, another type of review may have taken place before the first review. For instance, in a pre-existing system known to the applicants, an entitled individual may have been subject to a Client Information Update Review (CIUR). The CIUR could result in a Present Condition Report (PCR), where the PCR included a "completed code" that could take on one of many different values.

To transition such a database into the prioritized file review system described herein, a medium risk indication flag may be associated with corresponding to an entitled individual where a CIUR is overdue. The medium risk indication flag for an overdue-update-review may only be associated with the record before the first CVP review of the record. After the first CVP review, a high risk indication flag may be used in a situation where a CVP review is due (discussed hereinafter).

The medium risk indication flag for overdue-update-review may be associated with a record when the difference between the current date and the "Last PCR Visit" date, indicated in the record, exceeds a first pre-determined number of months (e.g., 12 months) and the PCR completed code is "Mail Out". The "Mail-Out" completed code indicates that a package has been sent to entitled individual that includes forms for the entitled individual to fill out to update information pertaining to the current financial situation of the entitled individual. For records having a PCR completed code other than "Mail Out", the medium risk indication flag for overdue-update-review will be set after a second predetermined number of months (e.g., 24 months) since the "Last PCR Visit" date.

1.7 Exemplary Risk Indication Flags Nos. 12 & 13—time-on-assistance

It may be that an entitled individual remains on assistance for a considerable length of time without having had any CVP review performed on corresponding record. A high risk indication flag for time-on-assistance may be associated with the record when the difference between the current date and a date of grant of entitlement, as indicated in the record, exceeds a first predetermined threshold, say 36 months. A medium risk indication flag for time-on-assistance may be associated with the record when the difference between the current date and a date of grant of entitlement, as indicated in the record, exceeds a second predetermined threshold, say 24 months.

Either risk indication flag for time-on-assistance may only be associated with a record when the record has not had a CVP review. Consequent, each risk indication flag for time-on-assistance may be applied only once, subsequently, the high risk indication flag for CVP-review-due is used to trigger a CVP review.

1.8 Exemplary Risk Indication Flags No. 11—CVP Review Due

It may be that, in order to meet legislative requirements, an in-person financial review must be conducted periodically. For instance, in one known jurisdiction, an in-person financial review must be conducted every 12 months. A CVP review may satisfy such a legislative requirement, therefore a high risk indication flag for CVP-review-due may be associated with a record a short period, say, one month, prior to the legislative imperative for the review. Therefore, in the above example, the high risk indication flag for CVP-review-due may be associated with the record once 11 months have elapsed since the most recent CVP review. The high risk indication flag for CVP-review-due may only be associated with records that have been through a CVP review at least once. Those records that have not been through a CVP review may not be associated with the high risk indication flag for CVP-review-due.

The CVP-review-due flag and the overdue-update-review flag may both be required during a transition. In particular, the overdue-update-review flag may be required as an initial rating while existing cases make a transition to the new (prioritized) file review process. Once the transition is complete, the overdue-updated-review flag would no longer be required.

To associate the high risk indication flag for CVP-review-due with a particular record, the MATT database 110 (FIG. 1) may be reviewed for a "Last In-Person CVP" date corresponding to the particular record. If a "Last In-Person CVP" date exists, a set number of months is added to that date to determine a "CVP Due" date, i.e., a date after which the high risk indication flag for CVP-review-due may be associated with the particular record. In the above example, 12 months would be added to the "Last In-Person CVP" date to determine the "CVP Due" date. If the record does not have a "Last In-Person CVP" date, then the record may be reviewed for a "CVP Completed" date. The "CVP Due" date may then be formulated by adding the set number of months to the "CVP Completed" date. If neither the "Last In-Person CVP" date not the "CVP Completed" date exists in the particular record, then the high risk indication flag for CVP-review-due may not be associated with the particular record. Note that a CVP review may not necessarily include an in-person interview.

The "CVP Due" date is then compared to the current date. If the difference between the "CVP Due" date and the current date is one month or less than the record may be associated with the high risk indication flag for CVP-review-due.

The legislative requirements for reviews may differ according to the type of record. That is, a record corresponding to an individual receiving a welfare entitlement may have a legislative requirement for a review every 12 a record corresponding to an individual receiving a disability benefits entitlement may have a legislative requirement for a review every 24 months. The assessment tool should have the ability to determine the type of entitlement from the record itself.

The sequence of the time-related flags then, begins when an individual receives an initial entitlement. After, say, a year without a CIUR, a medium overdue-update-review flag is associated with the record of the entitled individual. After two years without a CIUR, a medium time-on-assistance flag is associated with the record such that the record is given higher priority than those record with only a medium overdue-update-review flag. After three years without a CIUR, a high time-on-assistance flag is associated with the record such that the record is given higher priority that those records with a medium overdue-update-review flag and a medium time-on-assistance flag.

1.9 Exemplary Risk Indication Flag No. 7—business income

A medium risk indication flag for business-income may be associated with a record corresponding to an entitled individual where an examination record reveals an indication that the entitled individual has a business income.

1.10 Exemplary Risk Indication Flag No. 8—SIN Number Starts with '9'

In Canada, working-age citizens receive a Social Insurance Number (SIN), similar to the Social Security number in the United States. There are SINs assigned by the Canadian federal government that are intentionally temporary. These intentionally temporary SINs have an initial numerical position occupied by the digit "9". An entitled individual with such a SIN may have been assigned new, permanent SIN that has not been entered into the corresponding record. Additionally, there are circumstances where the SIN of a particular entitled individual has not been recorded in the corresponding record in the CWT database 104. A medium risk indication flag for a temporary-number may be associated with a record corresponding to an entitled individual where the record indicates a SIN that starts with "9" or the SIN field has been left blank.

1.11 Exemplary Risk Indication Flag No. 10—Pension Eligibility

A medium risk indication flag for pension-eligibility may be associated with a record corresponding to an entitled individual where an examination of the record reveals an indication that the entitled individual is eligible for government pension benefits but such benefits are not reflected in the record. This leads to the possibility of undetected pension benefits being received by the entitled individual. Where the entitled individual receives pension benefits and the corresponding record indicates that these benefits have been included in calculating an entitlement for the entitled individual, the record is excluded from being associated with the medium risk indication flag for pension-eligibility. To determine whether to associate the medium risk indication flag for pension-eligibility with a particular record, the record is examined to determine an age of the entitled individual. The medium risk indication flag for pension-eligibility may be associated with the record if this age is equal to or exceeds the age at which government pension eligibility arises, e.g., 60 years.

After a CVP review, a record is excluded from assessment for a further CVP review for a certain number of months, say three. Once the exclusion period has elapsed since the "CVP Completed" date for a particular record, the particular record may be re-evaluated to determine whether a change in priority is merited. As described herein above, a record may be assigned a priority of low, medium or high based on the number and nature of risk indication flags associated with the record. If a change in the flags associated with a particular record merit a change in priority from low or medium to high, the particular record may be included in the prioritized list of records passed to the monitoring and tracking tool with a high priority. So, even though a CVP review is not due according to time constraints, the change in priority of a particular record can cause that record to be reviewed for other reasons.

It may be that an entitled individual who moves from one municipality to another will be treated as a new case in the new municipality.

FIG. 4 illustrates an exemplary data structure 400 for a record. Although the CWT database 104 may store vastly more information associated with each individual, the exemplary data structure 400 includes only the information that is interest to the entitlements administration system 100. Such an exemplary data structure 400 may include a field for indicating a reason for applying for assistance of the type of assistance received 402. Other potential fields include a date of grant field 404, a case status field 406, a member name field 408, a member role field 410, a social insurance number field 412, a health card number field 414, a date of birth field 416, an accommodation information field 418, an immigration status field 420, an education status field 422, a date of last CVP review field 424, an income type field 426, an income amount field 428, an employer information field 430, an asset type field 432, an asset value field 434, a payment information field 436, a name and address of supporting person(s) field 438, a support information field 440 and a court arrangement indicator field 442.

Furthermore, there may be a set 450 of risk indicator fields, with one field for each of the risk indication flags. Each field of the set 450 is named FLAG X, where X ranges from 1—13. For the exemplary data structure 400, the risk indicator fields correspond to risk indication flags as follows: FLAG 1—high risk in flag for accommodation-costs; FLAG 2—medium risk indication flag for accommodation-costs; FLAG 3—medium risk indication flag for other-person-at-address; FLAG 4—high risk indication flag for support-in-pay (whereabouts of supporting person unknown); FLAG 5—medium risk indication flag for added-dependent; FLAG 6—medium risk indication flag for an overdue-update-review; FLAG 7—high risk flag indication for time-on-assistance; FLAG 8—medium risk flag indication for time-on-assistance; FLAG 9—high risk indication flag for no-support-in-pay; FLAG 10—high risk indication flag for CVP-review-due; FLAG 11—medium risk indication flag for business-income; FLAG 12—medium risk indication flag for a temporary-number; and FLAG 13—medium risk indication flag for pension-eligibility.

Each of the fields in the exemplary data structure 400, may further include sub-fields referred to in passing hereinbefore.

Valid entries in the case status field 406 include "Ongoing", "Terminated" and "On Hold".

As the exemplary data structure 400 may apply to an individual or an entire family, the member name field 408 includes the names of each the members of the family and the member role field 410 identifies a role in the family for each member (e.g., spouse, dependent).

The accommodation information field 418 may include sub-fields indicating a resident status (renting, owning, shared), an address for the accommodation and the expense of the accommodation (rent payments, lease payments, mortgage payments, agreement-for-sale payments, property taxes, condominium or co-op maintenance fees, property insurance premiums, heating fuel costs and utility costs).

Valid entries for the immigration status field 420 include "Citizen", "Landed Immigrant" and "Refugee Claimant".

The education status field 422 may be used to indicate the ongoing or completed status of the education of the applicant. Exemplary entries include "Attending Post Secondary" and "Post Secondary Completed".

The income type field 426 may include information regarding such income as boarder income, rental income, roomer income and business income. The amount and rate (e.g., per month) of the income is correspondingly reported income amount field 428.

The asset type field 432 may indicate asset types such as Cash, Bank Accounts, Bonds and Principal Property.

The payment information field 436 may include an indication of the total entitlement that has been assigned to the applicant as well as the actual amount being paid and the rate at which that amount is being paid. The actual being paid may take into consideration such factors as employment income and support payment income. The payment information field 436 may include a Check Number (if the entitlement is paid by check) as well as a Payment Amount and Issue Date for the check.

The name and address of supporting person(s) field 438 may include a sub-field for indicating "support person address unknown". Similarly, information field 436 may include a sub-field for indicating that a support payment is being deducted from the entitlement payment amount. As well, the support information field 440 may include sub-fields for providing notice of provisions associated with the support agreement. Additionally, the court arrangement indicator field 442 may include a Court Number field.

An example record 500 is presented in FIG. 5. The following is a consideration of the entries in the fields in the example record 500 for the purpose of associating risk indication flags with the example record 500.

As reported in the accommodation information field 418 of the example record 500, the applicant rents and pays $675 per month. The applicant's entitlement is reported, in the payment information field 436, As $200 per week. as the applicant's accommodation costs account for roughly 78% of the applicant's entitlement, the medium risk indication flag for accommodation-costs may be associated with the exemplary record 500.

A review of the accommodation information field 418 does not indicate any other person at the accommodation address. As such, the medium risk indication flag for other-person-at-address is not set.

There are three conditions for setting the high risk indication flag for support-in-pay (whereabouts of supporting person unknown). Initially, the marital status of the individual is assessed (in a field not shown in FIG. 4). If the marital status is not "Common Law" or "Married" and dependant children are included in the entitlement as reported in the member role field 410, then it through a review of the income type field 426, whether a support payment is being deducted from the individual's entitlement. Finally, if a support payment is being deducted, the entry in the name and address of supporting person(s) field 438 is reviewed for a value of "N/A" or "Unknown". As these three conditions are not met by the example record 500 in FIG. 5, the high risk indication flag for support-in-pay (whereabouts of supporting person unknown) is not set.

As a dependent is identified by an entry in the member name field 408 and a corresponding entry in the member role field 410, the corresponding entry in the date of birth field 416 is compared to the entry in the grant date field 404. In the example record 500 in FIG. 5, the date of birth of the dependent child is date of grant and medium risk indication flag for added-dependent may be associated with this example record 500.

One of the conditions for the setting of the medium risk indication flag for an overdue-update-review is that a CVP review has not happened yet. As can be seen in the date of last CVP review field 424, a CVP review has taken place and the medium risk indication flag for an overdue-update-review is not set.

As the medium risk and high risk flags for time-on-assistance depend on a "current date", for this example we can consider the current date to be Feb. 13, 2002. Comparing the current date to the date of grant of entitlement indicated the date of grant field 404, we see that about 12 months have elapsed. Where 36 months is the threshold for setting the high risk indication flag for time-on-assistance and 24 months is the threshold for setting the medium risk indication flag for time-on-assistance, neither of these flags needs to be set.

Since support has not been arranged, as may be ascertained through review of the name and address of supporting person(s) field 438, the support information field 440 and the court arrangement indicator field 442, it is unnecessary to flag the lack of payment of support with the high risk indication flag for no-support-in-pay.

A comparison of the entry in the date of last CVP review field 424 to the current date yields the information that it has been just over three months since the last CVP review. This three month time period is well below 11 month threshold past which the high risk indication flag for CVP-review-due would be set.

If the applicant was receiving declared business income, that income would be indicated in the income type field 426 and the corresponding income amount field 428. The exemplary record, however, does not indicate any business income Consequently, the medium risk indication flag for business-income is not set.

The applicant's social insurance number, as indicated in the social insurance number field 412, does not begin with a "9". Consequently, risk indication flag for a temporary-number is not set.

The current date may be used, in conjunction with the entry in the date of birth field 416, to determine an age for the applicant. The age for our exemplary applicant may be determined to be 35 years, which is well below an exemplary threshold for pension eligibility discussed hereinbefore as 60 years. As such, the medium risk indication flag for pension-eligibility is not set.

The set 450 of risk indicator fields in the example record 500 reflects the setting of flags as discussed above. In particular, FLAG 2—medium risk indication flag for accommodation-costs and FLAG 5—medium risk indication flag for added-dependent are set.

Where calculations are required in assessing a record as above, the calculation may be programmed using, for instance, Microsoft Visual Basic®.

As will be apparent to a person skilled in the art, what is herein referred to as "an individual with an entitlement" may, in fact, be more than a single individual, for instance, a family with an entitlement. The term "individual" is use herein for clarity.

Although rules for maintaining an entitlement are typically codified, some rules may be unfamiliar to, or misinterpreted by, some caseworker organization. Further, any periodic changes in the rules will exacerbate this problem. The result may be a non-uniform application of the entitlement rules, and unfairness in the system. Advantageously, the entitlements administration software including the assessment tool embodying an aspect of the present invention prioritizes records by applying the entitlement rules uniformly, thus increasing the fairness of the system.

Other modifications will be apparent to those skilled in the art and, therefore, the invention is defined in the claims.

We claim:

1. A method of assessing a record review priority comprising:
    providing a computer system having an associated database system;
    the computer system examining a plurality of database records for a presence of one or more conditions indicating at least one of the records needs review, wherein said database records relates to individuals receiving entitlements;
    the computer system associating a computer-selected risk indicator with each of said database records, wherein said risk indicator specifies whether said conditions are present in the associated record; and
    said computer system prioritizing one of said database records based on the associated risk indicator.

2. The method of claim 1 further comprising outputting said plurality of database records to a caseworker in an order based on each said risk indicator whereby a database record having one said associated risk indicator precedes those of said plurality of database records not having any said associated risk indicator.

3. The method of claim 1 wherein said plurality of database records relate to a like plurality of other individuals, each of said other individuals having an entitlement.

4. The method of claim 3 further comprising analyzing a set of historical entitlement data for said plurality of other individuals to assist in establishing said conditions.

5. The method of claim 3, wherein said associated risk indicator includes an indicator of degree of risk, one said degree of risk being high and another being medium, said method further comprising summing high risk indicators associated with each of said database records and medium risk indicators associated with each of said database records.

6. The method of claim 5 further comprising ordering said database records in accordance with said summing, whereby database records with a higher number of high risk indicators are ordered first and, in database records with an equal number of high risk indicators, database records with a higher number of medium risk indicators are ordered ahead of those database records with a lower number of medium risk indicators.

7. The method of claim 6 further comprising outputting database records to caseworkers for review based upon said ordering.

8. A computer readable medium containing computer-executable instructions which, when performed by a processor, cause the processor to:
    examine a database record, where said database record relates to an individual with an entitlement, for conditions indicating at least one of the records needs review ; and
    automatically associate a risk indicator with said database record based on said conditions wherein said risk indicator specifies a presence of one or more of said conditions.

9. A method of determining whether an entitlements database record should be reviewed by a case worker, the method comprising the steps of: providing a computer system having an associated database system; the computer system examining the entitlements database record for an indication of an individual's accommodation costs and an indication of the individual's total income; and if a ratio obtained, by the computer system, from said indication of accommodation costs and said indication of total income is within a warning range, associating a computer selected risk indicator with said database record and identifying said record to the case worker.

10. The method of claim 9 further comprising: repeating said examining and said associating for each of a plurality of database records; and outputting database records to a caseworker in an order based on each said risk indicator.

11. The method of claim 9 wherein said warning range is a first warning range and said risk indicator is a high risk indicator and further comprising, if said ratio is within a second warning range whereat accommodation costs are smaller in comparison with total income than within said first warning range, associating a medium risk indicator with said database record.

12. The method of claim 11 wherein said ratio comprises a quotient of said accommodation costs to said total income and wherein said ratio is within said first warning range when said quotient equals or exceeds 0.8.

13. The method of claim 12 wherein said ratio is within said second warning range when said quotient lies between 0.75 and 0.8.

14. The method of claim 13 wherein said total income comprises said entitlement, any employment income, any training wage and any income from accommodation sharing.

15. The method of claim 9 further comprising: examining said database record for an indication of another person at an address associated with said individual; and where said database record has an indication another person resides at said address for said individual, associating an other-person-at-address risk indicator with said database record.

16. The method of claim 9 further comprising: examining said database record for (i) an indication said individual is receiving support payments from a supporting person and (ii) an indication of an address for said supporting person; and
    where said database record has an indication said individual is receiving said support payments but no indication of said address for said supporting person, associating a support-in-pay risk indicator with said database record.

17. The method of claim 16 further comprising: examining said database record for (iii) an indication said entitlement extends to one or more children of said individual, and (iv) an indication of marital status of said individual; and associating said support-in-pay risk indicator with said database record only where said database record has an indication said entitlement extends to said one or more children and an indication said individual is not married or married-equivalent.

18. The method of claim 17 wherein said support-in-pay risk indicator is a high risk indicator.

19. The method of claim 17 wherein said indication said individual is receiving support payments from a supporting person is an indication a support payment is being deducted from said entitlement.

20. The method of claim 9 further comprising: examining said database record for an indication said individual has a new dependent; and where said database record has an indication said individual has a new dependent, associating an added-dependent risk indicator with said database record.

21. The method of claim 9 further comprising: examining said database record for an indication said individual has a business income; and where said database record has an indication said individual has a business income, associating a business-income risk indicator with said database record.

22. The method of claim 9 further comprising: examining said database record for an indication said individual has a temporary identification number; and where said database record has an indication that said individual has a temporary identification number, associating a temporary-number risk indicator with said database record.

23. The method of claim 9 further comprising: examining said database record for (i) an indication said individual is receiving support payments from any supporting person and (ii) an indication an arrangement for support payments has been made; where said database record has an indication said individual is not receiving said support payments and an indication an arrangement for support payments has been made, associating a no-support-in-pay risk indicator with said database record.

24. The method of claim 23 wherein said no-support-in-pay risk indicator is a high risk indicator.

25. The method of claim 24 wherein said indication an arrangement for support payments has been made comprises an indication of a court number in a support information field.

26. The method of claim 9 further comprising: determining a last entitlement review date associated with said database record, if any; and if said last entitlement review date is older than a threshold, associating a review-due risk indicator with said database record.

27. The method of claim 26 wherein said review-due risk indicator is a high risk indicator.

28. The method of claim 27 further comprising examining said database record to determine a type of said entitlement and wherein said threshold is dependent upon said type of said entitlement.

29. The method of claim 9 further comprising: examining said database record for an entitlement grant date associated with said individual; and if said entitlement grant date is older than a threshold, associating a time-on-assistance risk indicator with said database record.

30. The method of claim 29 wherein said time-on-assistance risk indicator is a first time-on-assistance risk indicator and a medium risk indicator and said method further comprises, if said entitlement grant date is older than a second threshold, where said second threshold is greater than said first threshold, associating a second time-on-assistance risk indicator with said database record.

31. The method of claim 30 wherein said second time-on-assistance risk indicator is a high risk indicator.

32. A computer readable medium containing computer-executable instructions which, when performed by a processor, cause the processor to: examine a database record of an individual for an indication of accommodation costs and an indication of total income; and if a ratio obtained from said indication of accommodation costs and said indication of total income is within a warning range, associate a risk indicator with said database record.

33. A method of determining whether an entitlements database record should be reviewed by a case worker, comprising: providing a computer system having an associated database system; the computer system examining a database record of an individual for (i) an indication said individual is receiving support payments from a supporting person and (ii) an indication of an address for said supporting person; and where, as determined by the computer system, said database record has an indication said individual is receiving said support payments but no indication of said address for said supporting person, associating a support-in-pay risk indicator with said database record.

34. A method of determining whether an entitlements database record should be reviewed by a case worker, comprising: providing a computer system having an associated database system; the computer system examining a database record of an individual for (i) an indication said individual is receiving support payments from any supporting person and (ii) an indication an arrangement for support payments has been made; and where, as determined by the computer system, said database record has an indication said individual is not receiving said support payments and an indication an arrangement for support payments has been made, associating a no-support-in-pay risk indicator with said database record.

35. A method of determining whether an entitlements database record should be reviewed by a case worker, comprising: providing a computer system having an associated database system; the computer system determining a last entitlement review date associated with a database record of an individual, if any; and if, as determined by the computer system, said last entitlement review date is older than a threshold, associating a review-due risk indicator with said database record.

36. A method of determining whether an entitlements database record should be reviewed by a case worker, comprising: providing a computer system having an associated database system; the computer system examining a database record of an individual for an entitlement grant date associated with said individual; and if, as determined by the computer system, said entitlement grant date is older than a threshold, associating a time-on-assistance risk indicator with said database record.

37. An entitlements administration server for determining whether an entitlements database record should be reviewed by a case worker, said entitlements administration server operable to: examine a database record of an individual for an indication of accommodation costs and an indication of total income; and if a ratio obtained from said indication of accommodation costs and said indication of total income is within a warning range, associate a risk indicator with said database record.

38. An entitlements administration server for determining whether an entitlements database record should be reviewed by a case worker, said entitlements administration server operable to: examine a database record of an individual for (i) an indication said individual is receiving support payments from a supporting person and (ii) an indication of an address for said supporting person; and where said database record has an indication said individual is receiving said support payments but no indication of said address for said supporting person, associate a support-in-pay risk indicator with said database record.

39. An entitlements administration server for determining whether an entitlements database record should be reviewed by a case worker, said entitlements administration server operable to: examine a database record of an individual for (i) an indication said individual is receiving support payments from any supporting person and (ii) an indication an arrangement for support payments has been made; and where said database record has an indication said individual is not receiving said support payments and an indication an arrangement for support payments has been made, associate a no-support-in-pay risk indicator with said database record.

40. An entitlements administration server for determining whether an entitlements database record should be reviewed by a case worker, said entitlements administration server operable to: determine a last entitlement review date associated with a database record of an individual, if any; and if said last entitlement review date is older than a threshold, associate a review-due risk indicator with said database record.

41. An entitlements administration server for determining whether an entitlements database record should be reviewed by a case worker, said entitlements administration server operable to: examine a database record of an individual for an entitlement grant date associated with said individual; and if said entitlement grant date is older than a threshold, associate a time-on-assistance risk indicator with said database record.

42. An improved data structure containing data related to entitlements eligibility, the improvement comprising one or more risk indication flags, wherein each of the risk indication flags is a Boolean values indicating an occurrence of a condition related to whether the data should be reviewed by a case worker, wherein values for each of the risk indication flags are automatically determined.

\* \* \* \* \*